(12) United States Patent
Verma et al.

(10) Patent No.: US 11,140,431 B2
(45) Date of Patent: Oct. 5, 2021

(54) METHOD AND SYSTEM FOR PRIORITIZING CONTENTS FOR CONTENT PROCESSING BY MULTICHANNEL VIDEO PROGRAMMING DISTRIBUTORS

(71) Applicant: Wipro Limited, Bangalore (IN)

(72) Inventors: Manish Verma, Bangalore (IN); Gowrishankar Subramaniam Natarajan, Torrance, CA (US)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/793,203

(22) Filed: Feb. 18, 2020

(65) Prior Publication Data

US 2021/0258626 A1    Aug. 19, 2021

(51) Int. Cl.
| | | |
|---|---|---|
| H04N 7/10 | (2006.01) | |
| H04N 7/025 | (2006.01) | |
| H04N 21/2668 | (2011.01) | |
| H04N 21/262 | (2011.01) | |
| H04N 21/845 | (2011.01) | |
| H04N 21/25 | (2011.01) | |
| G06N 20/00 | (2019.01) | |

(52) U.S. Cl.
CPC ......... *H04N 21/2668* (2013.01); *G06N 20/00* (2019.01); *H04N 21/251* (2013.01); *H04N 21/26225* (2013.01); *H04N 21/8456* (2013.01)

(58) Field of Classification Search
CPC ............. H04N 21/2668; H04N 21/251; H04N 21/26225; H04N 21/8456; G06N 20/00
See application file for complete search history.

(56) References Cited

U.S. PATENT DOCUMENTS

| | | |
|---|---|---|
| 8,752,112 B2 | 6/2014 | Krasic et al. |
| 2002/0112244 A1 | 8/2002 | Liou et al. |
| 2018/0020243 A1* | 1/2018 | Ni .................. G11B 27/031 |
| 2018/0039702 A1* | 2/2018 | Bailey ............. G06F 16/9535 |
| 2019/0188479 A1* | 6/2019 | Balasubramanian ................ G06K 9/00765 |
| 2019/0228231 A1* | 7/2019 | Tandon ............ G06K 9/00765 |

\* cited by examiner

*Primary Examiner* — Kyu Chae
(74) *Attorney, Agent, or Firm* — Finnegan, Henderson, Farabow, Garrett & Dunner, LLP

(57) ABSTRACT

Disclosed herein is method and system for prioritizing content for content processing by Multichannel Video Programming Distributors (MVPD). The system upon receiving multimedia content, determines premium quality vector for multimedia content. Further, system segments multimedia content into one or more segments and determines a complexity vector and social media vector for each segment. The complexity vector is identified based on scene transitions and complexity of scene in the segment. The social media vector is identified based on trend, popularity and viral nature of segment. The system assigns weightage to each segment using a machine learning model based on complexity vector, social media vector and premium quality vector. Based on weightage, system prioritizes segments for content processing. In this manner, present disclosure prioritizes content which needs to be first processed to reduce overall content processing time.

11 Claims, 4 Drawing Sheets

METHOD AND SYSTEM FOR PRIORITIZING CONTENTS FOR CONTENT PROCESSING BY MULTICHANNEL VIDEO PROGRAMMING DISTRIBUTORS

TECHNICAL FIELD

The present subject matter is generally related to multimedia content management and more particularly, but not exclusively, to a method and a system for prioritizing contents for content processing by Multichannel Video Programming Distributors (MVPD).

BACKGROUND

Multichannel Video Programming Distributors (MVPDs) provide attractive proposals for video consumption on user devices. Therefore, users are demanding premium and personalized multimedia content [also referred as content] to be available ubiquitously and delivered seamlessly faster.

Today MVPDs, Over the Top (OTT) video platforms take over few hours to couple of days to ingest, process and publish multimedia content to their subscribers through content processing workflow. This significantly limits their ability to compete on various levels. For example, the subscribers may not find and get multimedia content when they want, resulting in Average Revenue Per Unit (ARPU) losses for MVPDs. Further, from an operational standpoint, there may be poor visibility and predictability into the content processing workflow which limits the MVPDs to meet their Service Level Agreements (SLA) around publishing content.

The existing solutions perform just-in-time processing and reduce cost, as well as providing better monitoring insights into the content processing workflows to determine any inherent latencies. However, the existing content processing platforms have inherent limitations built into the workflow such as inability to prioritize processing of premium content. At present, the content that is ingested into the system is processed on a first come first serve basis. There is no way to prioritize the content for making it available earlier than other competitors. Also, the current content processing techniques ignore the fact that certain segments within the content tend to be more popular or viral lending themselves to be promoted as teasers, trailers or highlights which may require a prioritized processing and early publish relative to the rest of other content segments. Further, the workflow in the existing content processing technique is limited by sequential nature of content processing. Optimal utilization of resources for content processing is not possible in the current processing techniques as there is unequal distribution of workload across resources. Further, the existing content processing platforms provide just-in-time packaging (JITP) which enables to deliver adaptive bitrate Video on Demand (VOD) and Network or cloud based Digital Video Recorder (NDVR) content or content from live channels without pre-packaging all video assets. The packaging is performed on the fly in real time only when that content is requested by a viewer thereby saving storage, bandwidth and the like. However, JITP mechanism increases the latency of video playback.

The information disclosed in this background of the disclosure section is only for enhancement of understanding of the general background of the invention and should not be taken as an acknowledgement or any form of suggestion that this information forms the prior art already known to a person skilled in the art.

Disclosed herein is a method of prioritizing content for content processing by Multichannel Video Programming Distributors (MVPD). The method comprises receiving by a content prioritization system one or more multimedia content from one or more sources. Thereafter, the method comprises determining a premium quality vector for the one or more multimedia content based on one or more first parameters. The method further comprises segmenting each of the one or more multimedia content into one or more segments and for each segment, the method determines a complexity vector and a social media vector. Further, the method comprises assigning a weightage to each of the one or more segments using a machine learning model based on the complexity vector, the social media vector and the premium quality vector. Once the weightage is assigned, the method comprises prioritizing the one or more segments for content processing based on the weightage.

Further, the present disclosure discloses a system for prioritizing content for content processing by Multichannel Video Programming Distributors (MVPD). The system comprises a processor and a memory communicatively coupled to the processor. The memory stores the processor-executable instructions, which, on execution, causes the processor to receive one or more multimedia content from one or more sources. Thereafter, the processor determines a premium quality vector for the one or more multimedia content based on one or more first parameters and segments each of the one or more multimedia content into one or more segments. Further, the processor determines a complexity vector and a social media vector for the one or more segments. Once the complexity vector and the social media vector is determined, the processor assigns a weightage to each of the one or more segments using a machine learning model based on the complexity vector, the social media vector and the premium quality vector. Thereafter, the processor prioritizes the one or more segments for content processing based on the weightage.

Furthermore, the present disclosure comprises a non-transitory computer readable medium including instructions stored thereon that when processed by at least one processor cause the processor to prioritize content for content processing by Multichannel Video Programming Distributors (MVPD). Further, the instructions cause the processor to receive one or more multimedia content from one or more sources 101. Further, the instructions cause the processor to determine a premium quality vector for the one or more multimedia content based on one or more first parameters. Furthermore, the instructions cause the processor to segments each of the one or more multimedia content into one or more segments. Further, the instructions cause the processor to determine a complexity vector and a social media vector for the one or more segments. Thereafter, the instructions cause the processor to assign a weightage to each of the one or more segments using a machine learning model based on the complexity vector the social media vector and the premium quality vector. Finally, the instructions cause the processor to prioritize the one or more segments for content processing based on the weightage.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
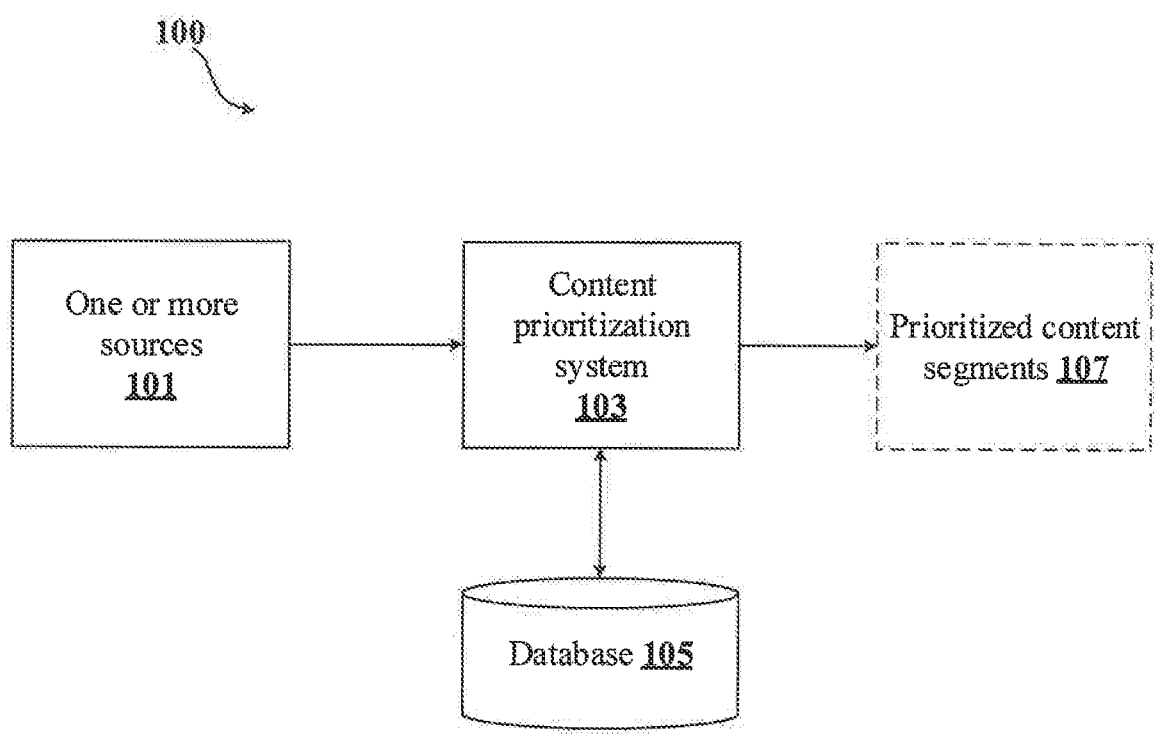
FIG. 1 shows an exemplary architecture for prioritizing content for content processing by Multichannel Video Programming Distributors (MVPD) in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternatives falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a content prioritization system [also referred as system] for prioritizing content for content processing by Multichannel Video Programming Distributors (MVPD). MVPDs provides video programming services to subscribers or the users. The content prioritization system may receive one or more multimedia content from one or more sources. Upon receiving the one or more multimedia content, the system may determine a premium quality vector for the one or more multimedia content based on one or more first parameters. The one or more first parameters may include, but not limited to, popularity, price, duration, rating, customer order or a genre. Based on these one or more first parameters the system may determine which multimedia content requires premium quality or high-quality processing. Further, the system may segment each of the one or more multimedia content into one or more segments and determine a complexity vector and social media vector for each of the one or more segments. The complexity vector may be identified based on scene transitions in the segment and complexity of scenes in the segment. The social media vector may be identified based on one or more second parameters which may include, but not limited to, trend, popularity and viral nature of the segment. Thereafter, the system may assign a weightage to each of the one or more segments using a machine learning model based on the complexity vector, the social media vector and the premium quality vector. Based on the assigned weightage, the system may prioritize the one or more segments for content processing. As an example, the prioritized one or more segments may be provided first with the one or more resources for content processing. Once the content is processed across different multimedia content, the segments may be sequenced into corresponding content and provided to the subscribers for viewing. In this manner, the present disclosure prioritizes the content which needs to be first processed to reduce the overall content processing time and also for optimal utilization of the one or more resources.

FIG. 1 shows an exemplary architecture for prioritizing content for content processing by Multichannel Video Programming Distributors (MVPD) in accordance with some embodiments of the present disclosure.

The architecture 100 may include a content prioritization system 103 [also referred as system] one or more sources 101 and a database 105 associated with the system 103 to store multimedia contents. The system 103 may be associated with the Multichannel Video Programming Distributors (MVPD) who provide video programming services to subscribers or users. The system 103 may receive one or more multimedia content from the one or more sources 101. The one or more sources 101 may be content providers such as Netflix®, You Tube®, Amazon Prime®, Disney®, Time Warner, Fox Studios® and the like. The multimedia content may use a combination of different content forms such as text, metadata, audio, image, video, animations, and interactive content like applications. Upon receiving the one or more multimedia content, the system 103 may determine premium quality vector for the one or more multimedia content. The system 103 may determine the premium quality vector based on one or more first parameters which may include, but not limited to, popularity, a price, a duration, a rating, customer order or a genre. Thereafter, the system 103 may segment the one or more multimedia content into one or more segments. Each segment may be of a predefined length. In an embodiment, the segment size may vary based on demarcation indicated. Thereafter, the system 103 may determine a complexity vector and a social media vector for each of the one or more segments. The complexity vector may be identified based on scene transitions in the segment and complexity of scenes in the segment. If there are more scene transitions or fast-moving action scenes in the segment, then such segments may be considered as more complex. The social media vector may be identified based on one or more second parameters which may include, but not limited to, trend, popularity and viral nature of the segment. If the segment is more trending in social media or becoming more popular then such segments may be associated with a high social media vector value.

Further, the system 103 may assign a weightage to each of the one or more segments using a machine learning model based on the features such as complexity vector, social media vector and premium quality vector. As an example, one or more segments with the premium quality vector and segments with high complexity vector and social media vector may be prioritized for content processing. Further, the system 103 may first provide the prioritized one or more segments with the one or more resources for the content processing so that these segments are first processed and available early for publishing.

Figure 2:
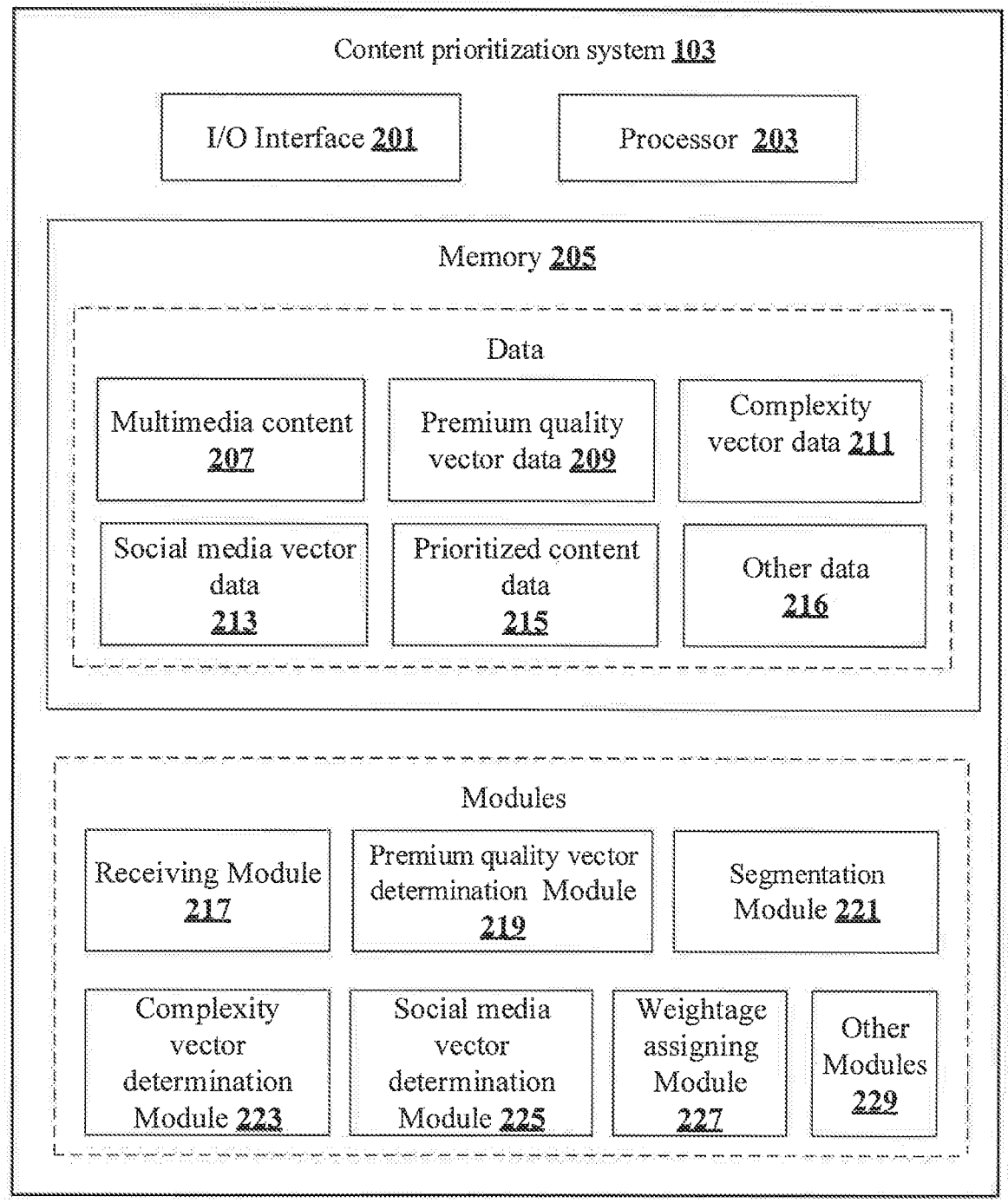
FIG. 2 shows a block diagram of a content prioritization system in accordance with some embodiments of the present disclosure.

FIG. 2 shows a block diagram of a content prioritization system in accordance with some embodiments of the present disclosure.

In some implementations, the system 103 may include I/O interface 201, a processor 203 and a memory 205. The I/O interface 201 may be configured to receive the one or more multimedia content from the one or more sources 101. The processor 203 may be configured to receive the one or more multimedia content from the one or more sources 101 and to prioritize the one or more multimedia content for content processing. The system 103 may include data and modules. As an example, the data is stored in a memory 205 configured in the system 103 as shown in the FIG. 2. In one embodiment, the data may include multimedia content 207, premium quality vector data 209, complexity vector data 211, social media vector data 213, prioritized content data 215, and other data 216. In the illustrated FIG. 2, modules are described herein in detail.

In some embodiments, the data may be stored in the memory 205 in form of various data structures. Additionally, the data can be organized using data models, such as relational or hierarchical data models. The other data 216 may store data, including temporary data and temporary files, generated by the modules for performing the various functions of the system 103.

In some embodiments, the data stored in the memory 205 may be processed by the modules of the system 103. The modules may be stored within the memory 205. In an example, the modules communicatively coupled to the processor 203 configured in the system 103, may also be present outside the memory 205 as shown in FIG. 2 and implemented as hardware. As used herein, the term modules may refer to an Application Specific Integrated Circuit (ASIC), an electronic circuit, a processor 203 (shared, dedicated, or group) and memory 205 that execute one or more software or firmware programs, a combinational logic circuit, and/or other suitable components that provide the described functionality.

In some embodiments, the modules may include, for example, a receiving module 217, a premium quality vector determination module 219, a segmentation module 221, a complexity vector determination module 223, a social media vector determination module 225, a weightage assigning module 227 and other modules 229. The other modules 229 may be used to perform various miscellaneous functionalities of the system 103. It will be appreciated that such aforementioned modules may be represented as a single module or a combination of different modules.

In an embodiment, the other modules 229 may be used to perform various miscellaneous functionalities of the system 103. It will be appreciated that such modules may be represented as a single module or a combination of different modules. Furthermore, a person of ordinary skill in the art will appreciate that in an implementation, the one or more modules may be stored in the memory 205, without limiting the scope of the disclosure. The said modules when configured with the functionality defined in the present disclosure will result in a novel hardware.

In an embodiment, the receiving module 217 may be configured to receive the one or more multimedia content from the one or more sources 101. The one or more sources 101 maybe content service providers. The received one or more multimedia content may be stored as multimedia content 207.

In an embodiment, the premium quality vector determination module 219 may be configured to determine premium quality vector for the one or more multimedia content based on one or more first parameters. The one or more first parameters may include, but not limited to, popularity, price, genre and rating. Based on the first parameters, the one or more multimedia content may be determined which are of premium quality and which requires high quality processing or encoding. The premium quality vector may be detected based on content-descriptor associated with the multimedia content. In an embodiment, the content provider may indicate the multimedia contents as belonging to a premium quality in the content descriptors. Based on such indication, the premium quality vector determination module 219 may determine the contents which are of premium quality. As an example, 4K HD videos may be indicated as premium quality contents. Further, in an embodiment, the premium quality vector may be determined for the multimedia content based on recency factor associated with the multimedia content. As an example, the multimedia content with a recent streaming time may be regarded as premium quality content than the video which is already streamed prior. The determined premium quality contents are stored as premium quality vector data 209.

In an embodiment, the segmentation module 221 may be configured to segment the one or more content into one or more segments with time encoded information. Each segment may be associated with metadata such as length of each segment and size of each segment. In an embodiment, the segmentation may be performed in order to aid in better encoding of the data in each segment so that more information could be transmitted over the network.

In an embodiment, the complexity vector determination module 223 may be configured to determine complexity vector for each of the one or more segments. The complexity vector may be determined based on scene transitions and complexity of the scenes in the segment. If the segment comprises fast moving actions or scene transitions or variations within the scene wherein the rate of change is high, then such segments may be classified as complex segments and hence may require high quality processing or encoding. As an example, the action filled scene may have high degree of information across scene transition compared to a scene with a plant or a lake which has low degree of information across scene transition. The complexity vector associated with the content are stored as complexity vector data 211.

In an embodiment, the social media vector determination module 225 may be configured to determine social media vector for each of the one or more segments. The social media vector may be determined using one or more second parameters. The one or more second parameters may include, but not limited to, popularity, trend and viral nature of the segment. These one or more second parameters may be identified from various social media websites. The one or more segments which are getting more viral and becoming popular or trending may be assigned with a high social media vector value. The social media vector associated with the contents are stored as social media vector data 213.

In an embodiment, the weightage assigning module 227 may be configured to assign a weightage for each of the one or more segments using a machine learning model based on the complexity vector, the social media vector and the premium quality vector. The machine learning model may be trained using features such as premium-ness, complexity and popularity of one or more content. The machine learning model may be trained to provide weightage to the one or more segments based on the impact of the features in the one or more segments. The weightage assigning module 227 may assign a weightage to the one or more segments based on weightage predicted by the machine learning model for the similar one or more segments. The one or more segments may be prioritized based on the weightage by the machine learning model when the segment is of premium nature, complex and popular in nature. The weightage may be provided as content descriptors. In an embodiment, the one or more segments may be prioritized for content processing based on the weightage. The prioritized one or more segments may be stored as prioritized content data 215. The prioritized one or more segments may first be provided with one or more resources for content processing. The one or more resources may be multi bit rate encoders for encoding the multimedia content. The one or more resources may be requested from a resource allocator which handles allocation and deallocation of the one or more resources for content processing. In an embodiment, the resource allocator may maintain current state of each of the one or more resources and provide information on when the one or more resources may be available for use. The one or more segments which are not prioritized may be provided with one or more resources after the prioritized segments are processed. However, when any of the resources are available and when the prioritized segments are already being processed, then the other segments which are not prioritized may also be processed in parallel.

In an embodiment, once each of the one or more segments is processed across different multimedia content, the one or more segments may be sequenced into corresponding content. As an example, there may be two multimedia content, a first content and a second content. The first content may comprise three segments, segment A, segment B and segment C. The second content may comprise two segments segment D and segment E. The order of processing may be segment C, segment D, segment E, segment B and segment A based on weightage assigned to these segments. Once the multimedia content is processed in this order, the content may be sequenced again as segment A, segment B and segment C corresponding to the first content and segment D and segment E corresponding to the second content.

Figure 3:
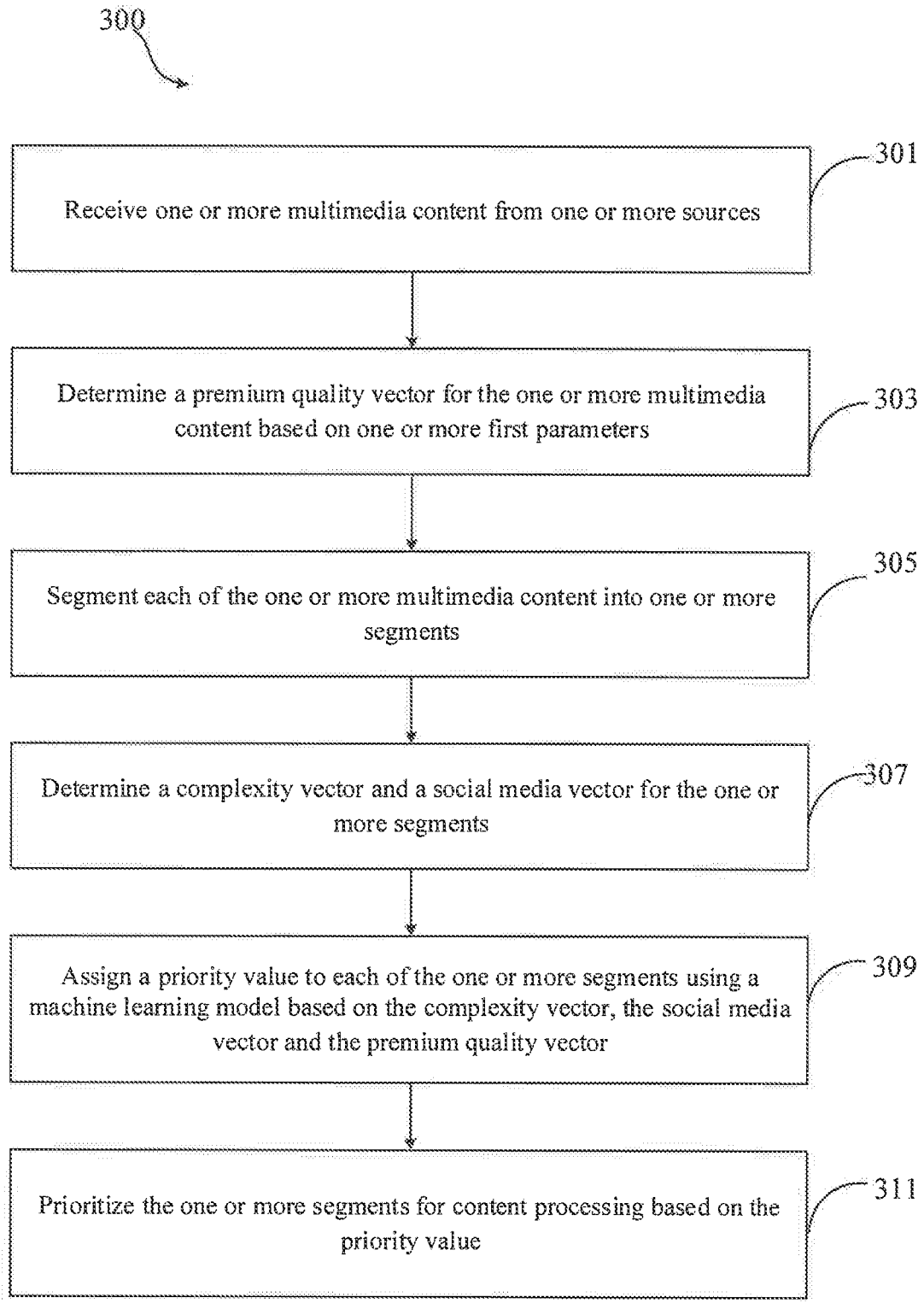
FIG. 3 shows a flowchart illustrating a method of prioritizing content for content processing by Multichannel Video Programming Distributors (MVPD) in accordance with some embodiments of the present disclosure.

FIG. 3 shows a flowchart illustrating a method of prioritizing content for content processing by Multichannel Video Programming Distributors (MVPD) in accordance with some embodiments of the present disclosure.

As illustrated in FIG. 3, the method 300 includes one or more blocks illustrating a method of prioritizing content for content processing by MVPD. The method 400 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method may include receiving one or more multimedia content from one or more sources 101.

At block 303, the method may include determining a premium quality vector for the one or more multimedia content based on one or more first parameters. The one or more first parameters may include, but not limited to, a popularity, a price, a duration, a rating, a customer order, or a genre.

At block 305, the method may include segmenting each of the one or more multimedia contents into one or more segments. Each segment may be of a predefined length. In one embodiment the length is time duration. In one embodiment the length is predefined number of frames.

At block 307, the method may include determining a complexity vector and a social media vector for the one or more segments. The complexity vector may be identified based on scene transitions and complexity of the scenes in the segments. The social media vector may be identified based on one or more second parameters comprising at least one of trend, popularity and viral nature of the segment.

At block 309, the method may include assigning a weightage to each of the one or more segments using a machine learning model based on the complexity vector, the social media vector and the premium quality vector.

At block 311, the method may include prioritizing the one or more segments for content processing based on the weightage. The prioritized one or more segments may first be provided with the one or more resources for content processing. Thereafter, the one or more segments which are not prioritized may be provided with the one or more resources for content processing.

Figure 4:
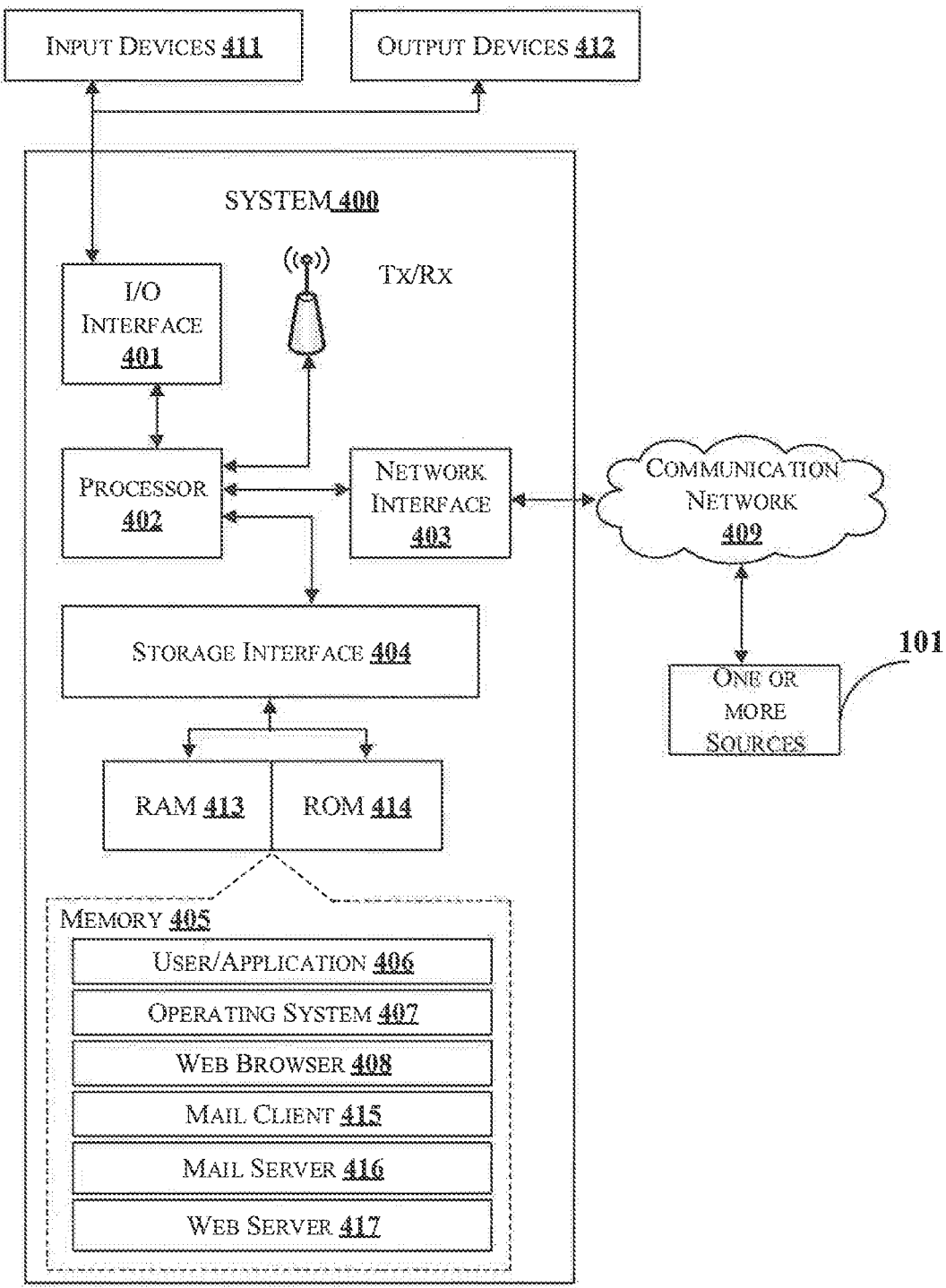
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a content prioritization system 103, which is used for content processing by Multichannel Video Programming Distributors (MVPD). The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. The computer system 400 may receive multimedia content from one or more sources 101.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization.

The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems 407 include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method and system for prioritizing content for content processing by Multichannel Video Programming Distributors (MVPD).

In an embodiment, the present disclosure prioritizes the content for content processing by identifying which content is premium in nature, complex in nature, and popular in nature.]

In an embodiment, in the present disclosure prioritizes the content and hence the overall content processing time is reduced in a pipeline processing.

In an embodiment, the present disclosure enables parallel processing across resources of the content and hence enables optimal utilization of the resources.

In an embodiment, the present disclosure predicts time for publishing the content to end subscribers.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Architecture |
| 101 | One or more sources |
| 103 | Content prioritization system |
| 105 | Database |
| 107 | Prioritized content segments |
| 201 | I/O interface |
| 203 | Processor |
| 205 | Memory |
| 207 | Multimedia content data |
| 209 | Premium quality vector data |
| 211 | Complexity vector data |
| 213 | Social media vector data |
| 715 | Prioritized content data |
| 216 | Other data |
| 217 | Receiving module |
| 219 | Premium quality vector determination module |
| 221 | Segmentation module |
| 223 | Complexity vector determination module |
| 225 | Social media vector determination module |
| 227 | Weightage assigning module |
| 229 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |
| 415 | Mail Client |
| 416 | Mail Server |
| 417 | Web Server |

What is claimed is:

1. A method of prioritizing content for content processing by Multichannel Video Programming Distributors (MVPD), the method comprising:
   receiving, by a content prioritization system, one or more multimedia content from one or more sources;
   determining, by the content prioritization system, a premium quality vector for the one or more multimedia content based on one or more first parameters;
   segmenting, by the content prioritization system, each of the one or more multimedia content into one or more segments;
   determining, by the content prioritization system, a complexity vector and a social media vector for the one or more segments;
   assigning, by the content prioritization system, a weightage to each of the one or more segments using a machine learning model based on the complexity vector, the social media vector and the premium quality vector; and
   prioritizing, by the content prioritization system, the one or more segments for content processing based on the weightage, wherein the prioritized one or more segments are first provided with one or more resources for the content processing.

2. The method as claimed in claim 1, wherein the one or more first parameters comprises at least one of a popularity, a price, a duration, a rating, a customer order, or a genre.

3. The method as claimed in claim 1, wherein the complexity vector is identified based on scene transitions in the segment and complexity of scenes in the segment.

4. The method as claimed in claim 1, wherein the social media vector is identified based on one or more second parameters comprising at least one of trend, popularity and viral nature of the segment.

5. The method as claimed in claim 1 further comprises sequencing the one or more segments into corresponding content upon the content processing of each of the one or more segments across different multimedia content.

6. A content prioritization system for prioritizing content for content processing by Multichannel Video Programming Distributors (MVPD), the content prioritization system comprising:
   a processor; and
   a memory communicatively coupled to the processor, wherein the memory stores the processor-executable instructions, which, on execution, causes the processor to:
   receive one or more multimedia content from one or more sources;
   determine a premium quality vector for the one or more multimedia content based on one or more first parameters;
   segment each of the one or more multimedia content into one or more segments;
   determine a complexity vector and a social media vector for the one or more segments;
   assign a weightage to each of the one or more segments using a machine learning model based on the complexity vector, the social media vector and the premium quality vector; and
   prioritize the one or more segments for content processing based on the weightage, wherein the prioritized one or more segments are first provided with one or more resources for the content processing.

7. The content prioritization system as claimed in claim 6, wherein the one or more first parameters comprises at least one of a popularity, a price, a customer order, a duration, a rating, or a genre.

8. The content prioritization system as claimed in claim 6, wherein the complexity vector is identified based on scene transitions in the segment and complexity of scenes in the segment.

9. The content prioritization system as claimed in claim 6, wherein the processor identifies the social media vector based on one or more second parameters comprising at least one of trend, popularity, or viral nature of the segment.

10. The content prioritization system as claimed in claim 6, wherein the processor further sequences the one or more segments into corresponding content upon the content processing of each of the one or more segments across different multimedia content.

11. A non-transitory computer readable medium including instructions stored thereon that when processed by at least one processor causes the processor to:
   receive one or more multimedia content from one or more sources;
   determining a premium quality vector for the one or more multimedia content based on one or more first parameters;
   segment each of the one or more multimedia content into one or more segments;
   determine a complexity vector and a social media vector for the one or more segments;
   assign a weightage to each of the one or more segments using a machine learning model based on the complexity vector, the social media vector and the premium quality vector; and
   prioritize the one or more segments for content processing based on the weightage, wherein the prioritized one or more segments are first provided with one or more resources for the content processing.

\* \* \* \* \*